(12) United States Patent
Hirayama

(10) Patent No.: US 11,187,931 B2
(45) Date of Patent: Nov. 30, 2021

(54) POLYMER NETWORK LIQUID CRYSTAL DISPLAY DEVICE AND LIQUID CRYSTAL DISPLAY METHOD

(71) Applicant: TOPPAN PRINTING CO., LTD., Tokyo (JP)

(72) Inventor: Ryuichi Hirayama, Hino (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 103 days.

(21) Appl. No.: 15/926,588

(22) Filed: Mar. 20, 2018

(65) Prior Publication Data

US 2018/0210244 A1 Jul. 26, 2018

Related U.S. Application Data

(63) Continuation of application No. PCT/JP2016/081333, filed on Oct. 21, 2016.

(30) Foreign Application Priority Data

Oct. 26, 2015 (JP) .............................. JP2015-210038

(51) Int. Cl.
*G02F 1/1334* (2006.01)
*G09G 3/36* (2006.01)
*G02F 1/1333* (2006.01)

(52) U.S. Cl.
CPC ............. *G02F 1/1334* (2013.01); *G09G 3/36* (2013.01); *G09G 3/3648* (2013.01); *G02F 1/13345* (2021.01); *G02F 1/133397* (2021.01); *G02F 2203/30* (2013.01); *G09G 2320/0257* (2013.01); *G09G 2320/106* (2013.01)

(58) Field of Classification Search
USPC ........................................................ 345/87
See application file for complete search history.

(56) References Cited

U.S. PATENT DOCUMENTS

| | | | |
|---|---|---|---|
| 5,539,547 A | 7/1996 | Ishii et al. | |
| 2005/0237294 A1* | 10/2005 | Miyachi | G09G 3/3648 345/102 |
| 2006/0250543 A1* | 11/2006 | Sugimoto | G02F 1/134363 349/62 |
| 2011/0141069 A1 | 6/2011 | Hirakata et al. | |

(Continued)

FOREIGN PATENT DOCUMENTS

| | | |
|---|---|---|
| CN | 1506686 A | 6/2004 |
| CN | 1211772 C | 7/2005 |

(Continued)

OTHER PUBLICATIONS

Taiwanese Office Action dated Nov. 8, 2017 in corresponding Taiwanese Patent Application No. 105134378.

(Continued)

*Primary Examiner* — Nicholas J Lee

(57) ABSTRACT

There is provided a polymer network liquid crystal display device for image display according to an input image signal. The device includes a determination unit configured to determine whether an image for display according to the image signal is a moving image or a still image, and a correction unit configured to correct a hysteresis of the image for display, based on a result of the determination by the determination unit.

4 Claims, 4 Drawing Sheets

(56) References Cited

U.S. PATENT DOCUMENTS

2012/0113157 A1    5/2012  Kim et al.
2014/0198123 A1*   7/2014  Shibamiya .............. G09G 3/36
                                                    345/589

FOREIGN PATENT DOCUMENTS

| CN | 1941053 A    | 4/2007  |
|----|--------------|---------|
| CN | 102466908 A  | 5/2012  |
| CN | 102763154 B  | 5/2015  |
| JP | 2001-92427   | 4/2001  |
| JP | 2003-036056 A| 2/2003  |
| JP | 2003-140112  | 5/2003  |
| JP | 2006-45416   | 2/2006  |
| JP | 2009-271349  | 11/2009 |

OTHER PUBLICATIONS

Written Opinion of the International Searching Authority dated Jan. 17, 2017 in corresponding International Application No. PCT/JP2016/081333.
International Search Report dated Jan. 17, 2017 in corresponding International Application No. PCT/JP2016/081333.
Office Action dated Oct. 15, 2019 in corresponding Japanese Patent Application No. 2015-210038 (4 pages) (4 pages English Translation).
First Notification of Examination Opinion dated Jun. 24, 2020 in Chinese Patent Application No. 201680062901.0.
English Translation by WIPO of the International Preliminary Report on Patentability dated May 11, 2018 in corresponding International Patent Application No. PCT/JP2016/081333, 7 pgs.

* cited by examiner

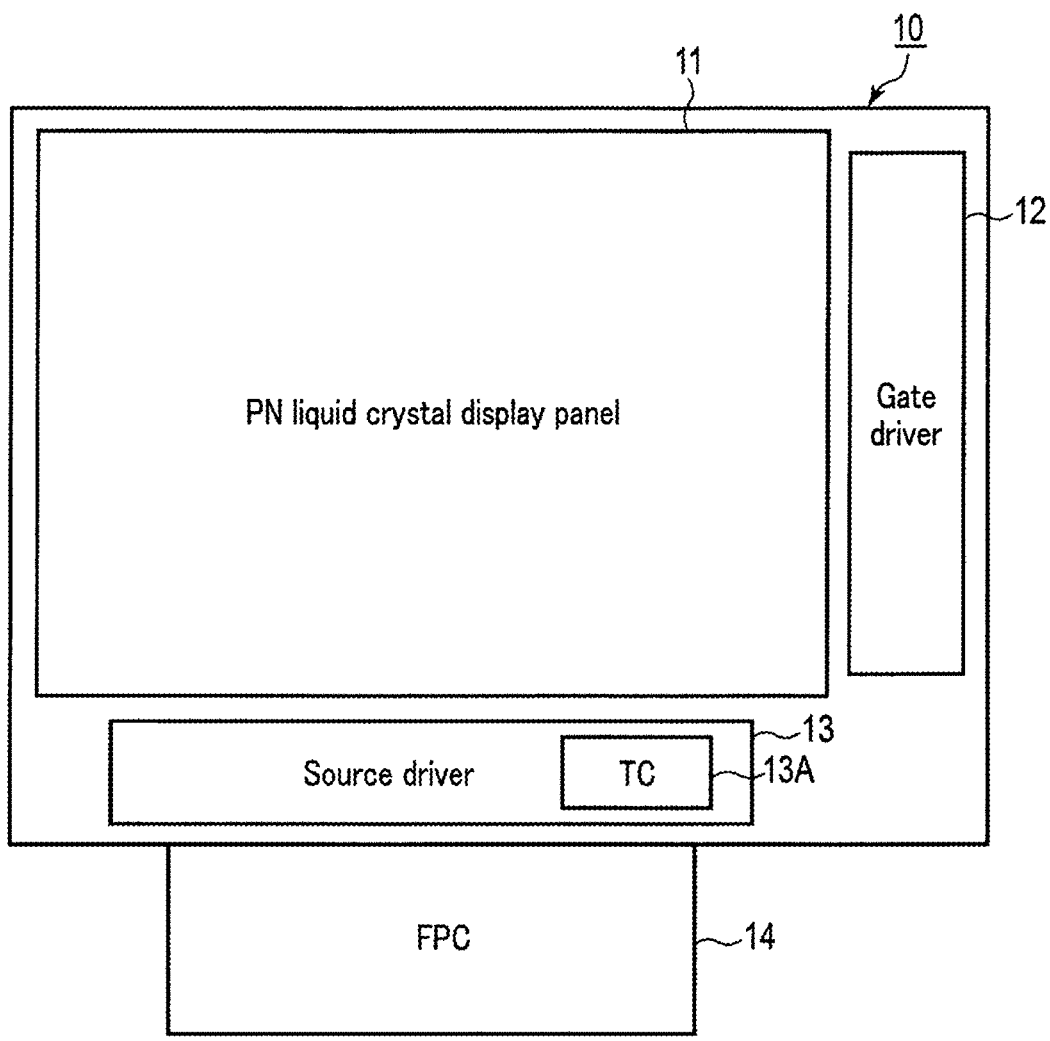
F I G. 1

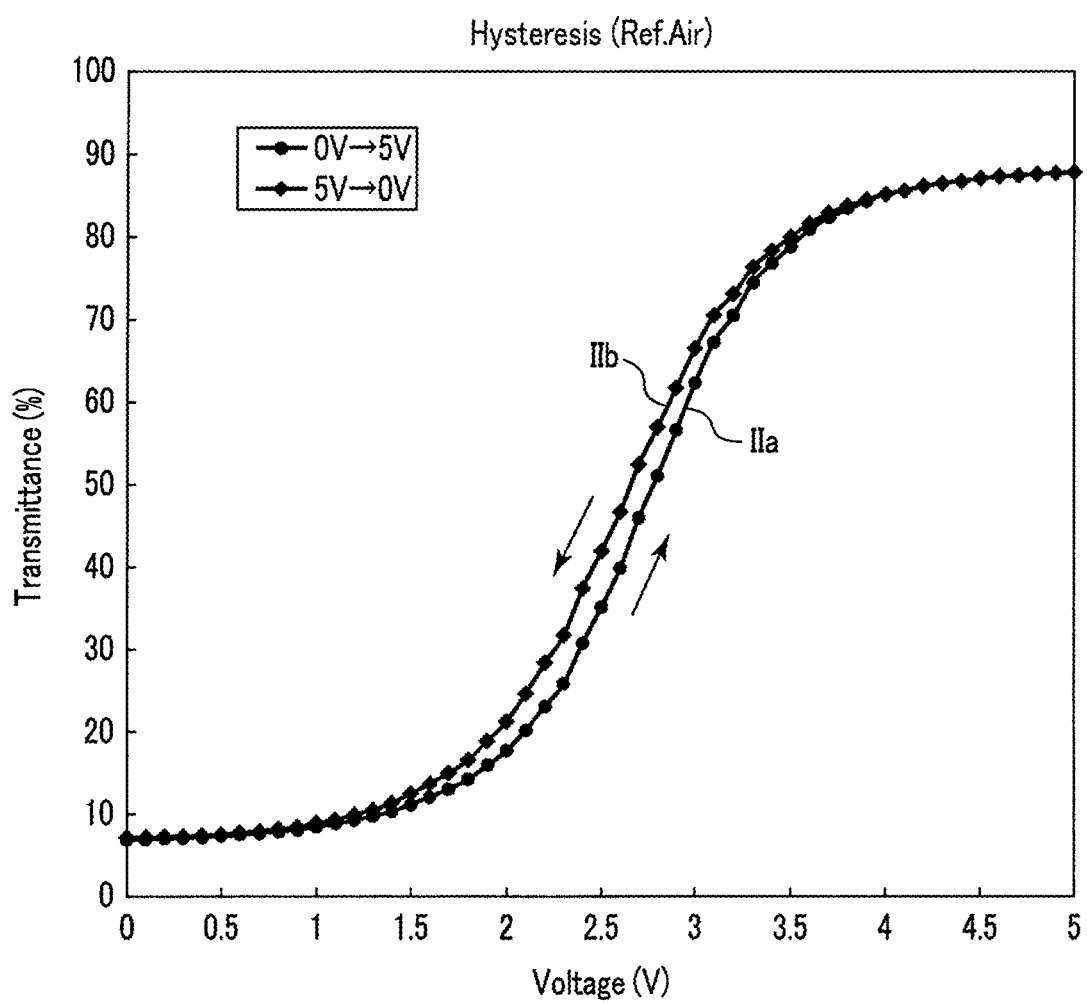
F I G. 2

POLYMER NETWORK LIQUID CRYSTAL DISPLAY DEVICE AND LIQUID CRYSTAL DISPLAY METHOD

CROSS-REFERENCE TO RELATED APPLICATIONS

This application is a Continuation Application of PCT Application No. PCT/JP2016/081333, filed Oct. 21, 2016 and based upon and claiming the benefit of priority from Japanese Patent Application No. 2015-210038, filed Oct. 26, 2015, the entire contents of all of which are incorporated herein by reference.

FIELD

The present invention relates to a polymer network liquid crystal display device and a liquid crystal display method.

BACKGROUND

Polymer network liquid crystals for displaying moving images (hereinafter, "PN liquid crystals") entail a low response speed as compared to normal liquid crystals of twisted nematic (TN) type, etc., and have hysteresis characteristics that exhibit curves of voltage-transmittance characteristics differing between the instances of raising and lowering a voltage. As such, images by PN liquid crystals often involve the appearance of afterimages, and this has hindered the practical realization of multi-gradation display devices.

The conventional solution to this situation required the use of a frame memory to sequentially monitor the change in display data for each pixel, and the control to further correct the gradations of the display data so that a generated hysteresis would be corrected according to the change in the display data. This has greatly increased the costs of system architecture due to the necessity of a CPU that enables fast and complicated system processing, a large-capacity frame memory that can operate at high speed, and so on.

A technique has also been proposed that permits pixel display only in the direction of voltage rise in order to remove the hysteresis characteristics of a polymer dispersed liquid crystal that exhibit curves of voltage-transmittance characteristics differing between the instances of raising and lowering a voltage (e.g., Patent Literature 1).

CITATION LIST

Patent Literature

Patent Literature 1: Jpn. Pat. Appln. KOKAI Publication No. 2001-092427

SUMMARY

The technique described in the patent literature is to cause a liquid crystal that assumes an alternating-current drive condition to display images in only the direction to raise a voltage or the direction to lower a voltage. Since the technique omits image display in the other direction, at least a half of the operating period would not allow for displaying images or transmittance, resulting in the drawback of only enabling the display of images with a low display quality in terms of contrast, etc.

The present invention has been formulated in consideration of such circumstances, and its object is to provide a polymer network liquid crystal display device and a liquid crystal display method that can achieve, while adopting a simple circuit scale, a good display quality by preventing the occurrence of afterimages which are due to the hysteresis characteristics inherent in PN liquid crystals.

According to one aspect of the present invention, there is provided a polymer network liquid crystal display device for image display according to an input image signal, the device comprising: a determination unit configured to determine whether an image for display according to the image signal is a moving image or a still image; and a correction unit configured to correct a hysteresis of the image for display, based on a result of the determination by the determination unit.

According to the present invention, it is possible to achieve a good display quality by preventing the occurrence of afterimages due to the hysteresis characteristics inherent in PN liquid crystals, while adopting a simple circuit scale.

BRIEF DESCRIPTION OF THE DRAWINGS

FIG. 1 is a block diagram showing a schematic configuration of an entire PN liquid crystal display device according to one embodiment of the present invention;

FIG. 2 is a diagram exemplifying hysteresis characteristics of a PN liquid crystal display panel according to the embodiment;

DETAILED DESCRIPTION

Figure 3:
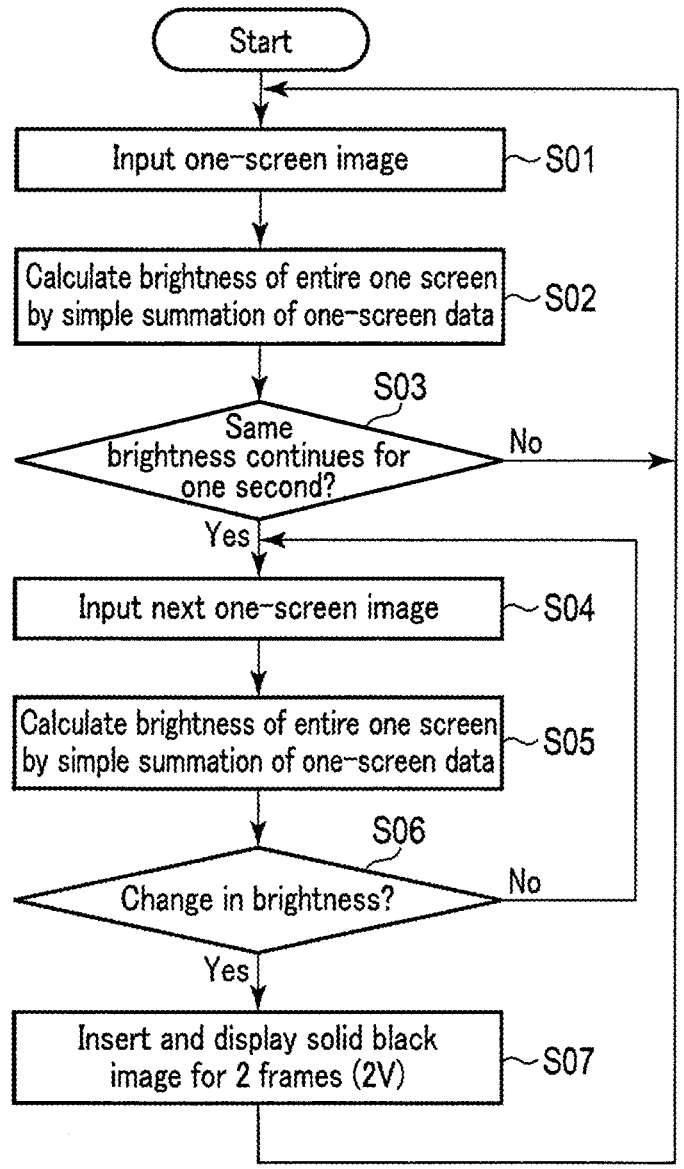
FIG. 3 is a flowchart showing contents of hysteresis correction processing according to the embodiment.

Embodiments will be described with reference to the drawings. Note that the drawings are schematic or conceptual, and it is not a requisite that the dimensions, scales, etc. read from each drawing conform to actual products. Also, the drawings may show same portions in different dimensional relationships or scales. In particular, the following embodiments are exemplifications of the devices and the methods for embodying the technical idea of the present invention, which will not be limited by components' shapes, structures, arrangements, etc. The description will use same symbols for the elements having the same functions and configurations, and will repeat explanations only if necessary.

[Configuration of Liquid Crystal display Device]

FIG. 1 is a block diagram showing a schematic configuration of an entire PN liquid crystal display device 10 according to one embodiment of the present invention. In the figure, symbol 11 denotes a PN liquid crystal display panel having, for example, a VGA (480 vertical pixels×640 horizontal pixels) display capacity, which is driven for display by its gate electrode group scan-driven by a gate driver 12 and its source electrode group driven by a source driver 13.

The source driver 13 incorporates a timing controller (TC) 13A that may be constituted from a type of digital signal processor (DSP).

This timing controller 13A converts image data of a digital signal format, such as a mobile industry processor interface (MIPI) format, a mobile display digital interface (MDDI) format, or an RGB format, input to the PN liquid crystal display device 10 via a flexible printed circuit board (FPC) 14, into the format that accords with the pixel configuration of the PN liquid crystal display panel 11. In conjunction with this, the timing controller 13A generates operation clock signals, etc. required for display, and supplies them to the source driver 13 and the gate driver 12.

The timing controller 13A also changes the contents of the output image data as appropriate by following the hysteresis correction processing described later, so that the whole image will temporarily turn black (OFF and non-transmissive).

FIG. 2 is a diagram showing the variations in transmittance of the PN liquid crystal display panel 11 between the instances of voltage rise and voltage decline. As shown in this figure, the PN liquid crystal display panel 11 has hysteresis characteristics that yield a high transmittance at particularly the intermediate values on the transmittance characteristic IIb representing the instance of lowering the application voltage from 5[V] to 0[V], as compared to the transmittance characteristic IIa representing the instance of raising the application voltage from 0[V] to 5[V]. Depending on image contents, this can cause an afterimage to appear.

[Operations of Liquid Crystal Display Device]

Next, operations in the embodiments will be described.

FIG. 3 is a flowchart showing the outline of the hysteresis correction processing performed by the timing controller 13A as a DSP for the image data to supply to the source driver 13.

Referring to the figure, a one-screen amount of data for display on the PN liquid crystal display panel 11 is first input to the timing controller 13A (step S01). After appropriately converting the data into the format required by the PN liquid crystal display panel 11, all the pixel components of the one-screen image data are subjected to simple summation to calculate the brightness of the entire one screen, and the calculation result is retained for a certain length of time, for example, 1 second (step S02).

Then, the timing controller 13A refers to the retained data about the brightness of the entire screen that covers the immediately preceding certain length of time, e.g., 1 second, and determines whether or not the image currently displayed by the PN liquid crystal display device 10 is a still image based on the presence of a change in the data value (step S03).

If the retained brightness value of the entire screen for 1 second involves a change and it is determined that the image currently displayed by the PN liquid crystal display device 10 is not a still image (step S03, No), the timing controller 13A returns to the processing in step S01 by assessing that the currently displayed image is a moving image and that there is an insignificant image quality-deteriorating influence from the afterimage that might be appearing at the moment due to the hysteresis characteristics of the PN liquid crystal display panel 11.

Also, if in step S03 the retained brightness value of the entire screen for 1 second does not involve a change so that it is determined that the image currently displayed by the PN liquid crystal display device 10 is a still image (step S03, Yes), a one-screen amount of data for the next display on the PN liquid crystal display panel 11 is input to the timing controller 13A (step S04). After converting the data into the format required by the PN liquid crystal display panel 11, all the pixel components of this one-screen image data are subjected to simple summation to calculate the brightness of the entire one screen (step S05).

Determination is made as to whether or not the brightness of the entire one screen based on this image data for the next display changes from the brightness of the immediately preceding still image (step S06).

If it is determined that there is no change between the brightness of the entire one screen based on the image data for the next display and the brightness of the immediately preceding still image (step S06, No), the timing controller 13A returns to the processing in step S04 by assessing that an afterimage would not be displayed with the next image data and that the still image having been displayed up to then will continue.

Also in step S06, if it is determined that there is a change between the brightness of the entire one screen based on the image data for the next display and the brightness of the immediately preceding still image (step S06, Yes), the timing controller 13A assesses that an afterimage would be displayed with the next image data and causes the PN liquid crystal display panel 11 to display, instead of the next image data, "solid black" image data for turning the entire screen black for a perceptually- and visually-unrecognizable short time, e.g., for as much as 2 frames (=1/30 [second]) under the frame rate of 60 [frame/second] (step S07).

This cuts off the afterimages appearing on the PN liquid crystal display panel 11 due to the hysteresis characteristics so that the display content can be refreshed. After the processing of displaying the "solid black" image, the timing controller 13A returns to the processing in step S01 and the display operation continues.

Figure 4:
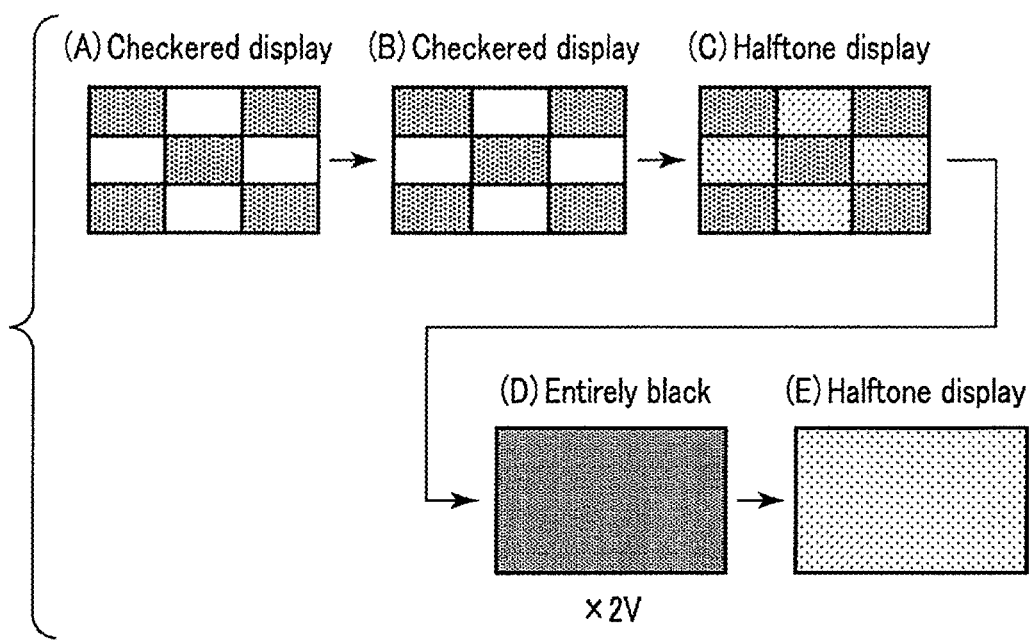
FIG. 4 is a diagram exemplifying transition of images displayed on a PN liquid crystal display panel, by the processing of FIG. 3 according to the embodiment.

FIG. 4 is a diagram exemplifying the transition of images displayed on the PN liquid crystal display panel 11, by the processing of FIG. 3 above.

FIG. 4 (A) shows the state assuming that a still image having a white-and-neutral color checkered pattern has been continuously displayed for one second or longer. Here, it will be supposed that the same still image as shown in FIG. 4 (B) is input as the next image. In this instance, the processing in FIG. 3 proceeds with steps S01 to S02 and it is determined in step S03 that the still image is currently on display (step S03, Yes). Then, after the processing in steps S04 and S05, it is determined in step S06 that the next image has the same brightness and does not involve a change (step S06, No), and the processing starts over from step S04 again.

Thereafter, if a succeeding input image contains a change from FIGS. 4 (A) and (B) such that the white portions in the checkered pattern become half tone as shown in FIG. 4 (C), it is determined in step S06 that the succeeding image involves a change in brightness (step S06, Yes), and the PN liquid crystal display panel 11 is caused to display a "solid black" image for 2 frames (2V) in step S07 as shown in FIG. 4 (D) (the figure uses dense dots in substitution for solid black representation) in order to avoid the afterimage display due to the hysteresis characteristics of the PN liquid crystal display panel 11.

After displaying the "solid black" image, if a half tone image as shown in FIG. 4 (E) is to be displayed, the timing controller 13A discriminates between a moving image and a still image through the processing in steps S01 to S03, and continues the same processing as discussed above according to the discrimination result.

Note that the period for displaying the "solid black" image is not limited to 2 frames (2V) as discussed, but may be discretionarily selected according to the hysteresis characteristics of the PN liquid crystal display panel 11 itself and the frame rate for the ongoing display of image data, as long as it is a short time that is perceptually- and visually-unrecognizable for a human being.

[Effects of Liquid Crystal Display Device]

According to the embodiments as described above, it is possible to achieve a good display quality by preventing the occurrence of afterimages due to the hysteresis characteristics inherent in PN liquid crystals, while adopting a simple circuit scale.

Also according to the above embodiments, all the pixel components of input image data are summed, and whether the displayed image is a moving image or a still image is determined based on whether or not the summation result equals the result of the same summation processing for the immediately preceding certain length of time. Thus, the embodiments can reduce the load on a processor, i.e., the timing controller 13A, by the simple arithmetic operations to track the discrimination between a moving image and a still image.

According to the above embodiments, moreover, a "solid black" image to temporarily shut off the entire image display is continuously displayed for a given number of frames, as the means for suppressing the afterimage display due to the hysteresis characteristics of the PN liquid crystal display panel 11. Thus, the embodiments can realize the correction processing for hysteresis characteristics while reducing the power consumption in the PN liquid crystal display panel 11.

Additionally, according to the above embodiments, the period for displaying the "solid black" image is set to the visual recognition limit of a human being or shorter. Thus, the embodiments can securely prevent the afterimage display without deteriorating the display quality.

The present invention is not limited to the embodiments described, but can be modified in various ways in practice without departing from the gist of the invention. Also, the functions performed in the described embodiments may be suitably combined for implementation as much as possible. The described embodiments involve various aspects, and appropriate combinations of the disclosed features permit various inventions to be derived. For example, if omission of several features from the whole configuration or structure disclosed for the embodiments would provide the effects, the configuration or structure after such omission of features may be derived as an invention.

The invention claimed is:

1. A polymer network liquid crystal display device to suppress an occurrence of afterimages which are due to hysteresis characteristics inherent in polymer network liquid crystals, the polymer network liquid crystal display device comprising:
    a liquid crystal display panel to display an image according to image data input to the liquid crystal display panel; and
    a controller configured to:
        determine whether an image currently displayed on the liquid crystal display panel is a moving image or a still image, based on whether an entire screen brightness of the currently displayed image is changed within a set length of time,
        in response to the currently displayed image being a still image as determined based on the entire screen brightness of the currently displayed image not being changed within the set length of time, determine whether an entire screen brightness of a next image to be displayed next on the liquid crystal display panel after the still image is displayed changes from an entire screen brightness of the still image on the liquid crystal display panel, and
        suppress, when the entire screen brightness of the next image changes from the entire screen brightness of the still image, an afterimage display due to hysteresis characteristics of the liquid crystal display panel, by continuously displaying, on the liquid crystal display panel, a solid black image for a given number of frames to shut off entire displaying of the liquid crystal display panel after the still image is displayed and before the next image is displayed,
    wherein the controller is configured to continuously display the solid black image by changing contents of the image data to be input to the liquid crystal display panel, the changed contents to cause the liquid crystal display panel to shut off the entire display to turn black and to be in a non-transmissive state of the liquid crystal display panel.

2. The polymer network liquid crystal display device according to claim 1, wherein, to determine whether the image currently displayed on the liquid crystal display panel is the moving image or the still image, based on whether the entire screen brightness of the currently displayed image is changed within the set length of time,
    the controller is configured to
        determine the entire screen brightness of the currently displayed image based on a calculated sum of pixel values respectively corresponding to all pixel components of the currently displayed image, and
        determine whether the currently displayed image is the moving image or the still image based on whether the sum of the pixel values is changed within the set length of time.

3. The polymer network liquid crystal display device according to claim 1, wherein the given number of frames to shut off the entire display is set based on a visual recognition limit of a human being or shorter.

4. A method for a polymer network liquid crystal display device to suppress an occurrence of afterimages which are due to hysteresis characteristics inherent in polymer network liquid crystals, the polymer network liquid crystal display device including a liquid crystal display panel to display an image according to an image data, the method comprising:
    determining, by a controller of the polymer network liquid crystal display device, whether an image currently displayed on the liquid crystal display panel according to the image data is a moving image or a still image, based on whether an entire screen brightness of the currently displayed image is changed within a set length of time;
    in response to the currently displayed image being the still image as determined based on the entire screen brightness of the currently displayed image not being changed within the set length of time, determining, by the controller, whether an entire screen brightness of a next image to be displayed next on the liquid crystal display panel after the still image is displayed changes from an entire screen brightness of the still image on the liquid crystal display panel; and
    suppressing, by the controller, when the entire screen brightness of the next image changes from the entire screen brightness of the still image, an afterimage display due to hysteresis characteristics of the liquid crystal display panel, by continuously displaying, on the liquid crystal display panel, a solid black image for a given number of frames to shut off entire displaying of the liquid crystal display panel after the still image is displayed and before the next image is displayed,
        wherein the continuously displaying the solid black image comprises changing, by the controller, contents of the image data to be input to the liquid crystal display panel, the changed contents to cause the liquid crystal display panel to shut off the entire display to turn black and to be in a non-transmissive state of the liquid crystal display panel.

\* \* \* \* \*